May 17, 1932.  G. C. CHASE  1,858,763
MECHANICAL MOVEMENT
Filed Aug. 27, 1930    2 Sheets-Sheet 1

Inventor
George C. Chase.
By E. W. Anderson
Attorney

May 17, 1932.  G. C. CHASE  1,858,763
MECHANICAL MOVEMENT
Filed Aug. 27, 1930   2 Sheets-Sheet 2

Inventor
George C. Chase.
By E. W. Anderson
Attorney

Patented May 17, 1932

1,858,763

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

MECHANICAL MOVEMENT

Application filed August 27, 1930. Serial No. 478,249.

The invention relates to mechanical movements applicable to power transmission mechanism and to other mechanisms wherein variable movement of a driven member is to be provided for, the mechanism comprising a train of "orbital" gearing, and means whereby constant speed rotation of the driving member of said train may be efficiently converted into a periodically accelerated and retarded movement of the driven member thereof.

The gearing herein termed "orbital" is of the character commonly termed planetary, differential, epicyclic, hypocyclic, and sometimes eccentric or shifting; each of these terms implying some limitation unfitting it for accurate definition of this class of devices as a whole. These devices operate on a single principle but vary considerably in detail, and may be defined as gearing including a member having rotary motion and also moving in an orbit.

The invention is useful in securing any one of a number of variable movements, wherein a definite advance of the driven member is desired at each cycle or grand cycle of operation, an object being to provide an improved device wherein the speed ratio transmitted will be uniformly increased and diminished from zero to maximum ratio and from maximum to zero.

The form of the invention shown provides for a dwell, or period of rest during a portion of the rotation of the driving member.

The invention consists in the novel construction and combination of parts, as set forth in the appended claim.

In the accompanying drawings illustrating an embodiment of the invention:

Figure 1:
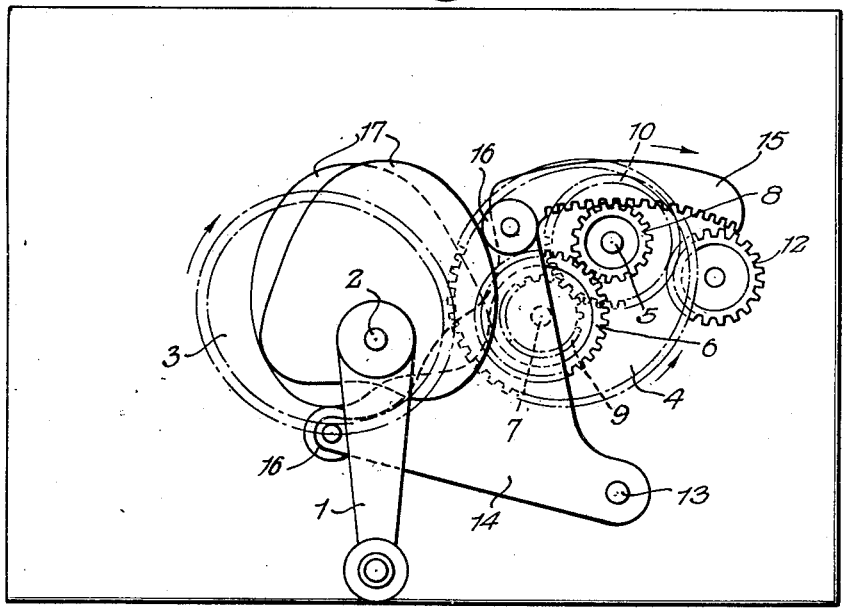
Figure 1 is a face view of the working parts, showing their direction of rotation and revolution during non-driving movement.
Figure 2:
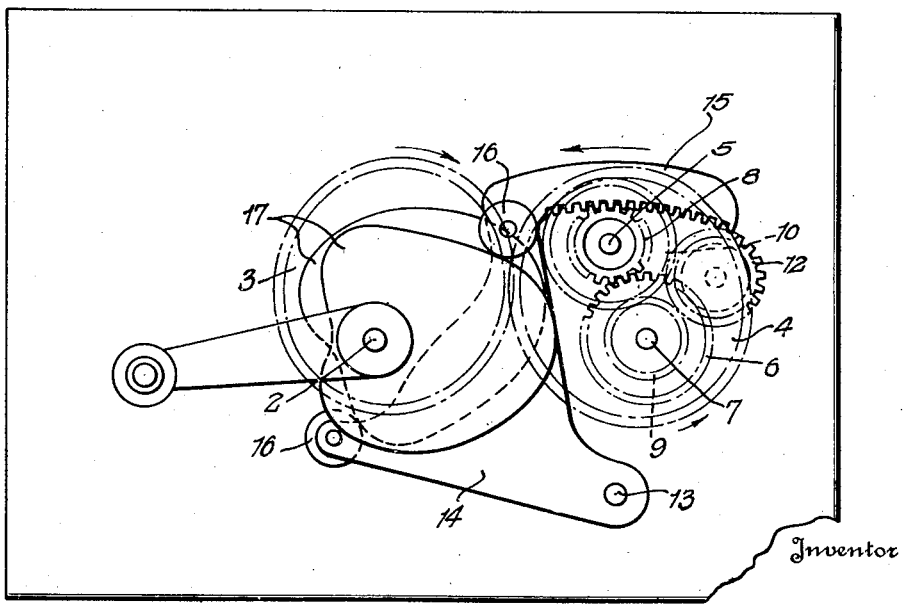
Fig. 2 is a similar view taken during the driving movement of the parts.
Figure 3:
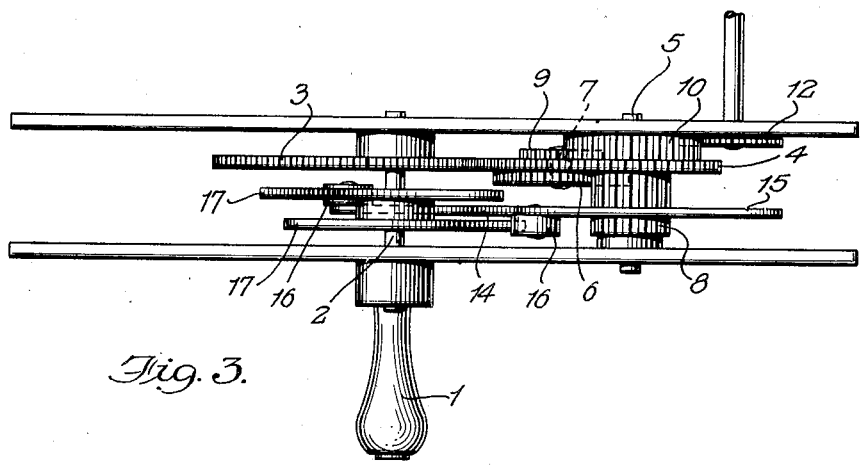
Fig. 3 is a top plan view of the mechanism.

Referring to Figs. 1, 2, and 3, the driving elements of the mechanism comprise an operating crank 1, secured upon drive shaft 2, the latter carrying fast thereon elliptical gear 3, meshing with elliptical gear 4, loose upon shaft 5. Gears 3 and 4 are so designed that the latter will be driven as nearly as possible at the desired speed ratios to be transmitted, as will be explained more fully hereinafter.

The speed ratios of elliptical gear 4 are modified, in transmission to the driven member of the train, so as to increase the speed at certain points of the cycle, and to correspondingly decrease the speed at other points. This is accomplished by the provision of differential gearing, one leg of which is driven by elliptical gear 4 and another leg of which is driven by modifying means to be described hereinafter.

The differential gearing comprises an orbital gear 6, for which gear 4 serves as a supporting arm, gear 6 meshing with and being carried around a gear 8, loosely mounted on shaft 5. Secured to orbital gear 6 by means of the supporting stud 7, is a gear 9, meshing with a gear 10, mounted on shaft 5. For convenience in explaining the operation of the invention, a driven pinion 12 is shown, meshing with gear 10, pinion 12 being designed to receive one rotation for each rotation of operating crank 1.

The principle of differential gearing being well-known, it will be sufficient to say that the movement transmitted by elliptical gear 4 to driven pinion 12 will always have a plus value; and that movement of gear 8, by the modifying means, may transmit movement of either a plus or a minus value to driven pinion 12, which will augment, diminish, counteract or reverse the movement transmitted by gear 4.

The preferred means for imparting movement to the gear 8 to modify the movement of the driven pinion 12, comprises a lever 14, fulcrumed on shaft 13, and having a segmental toothed rack or gear 15, meshing with the teeth of gear 8. The lever 14 is oscillated by means of the rollers 16 mounted upon arms of lever 14 and engaging the cams 17 fast upon shaft 2. The two cams 17 are alike in contour and arranged for complemental action upon the rollers 16. Thus, if the shaft 2 is rotated, lever 14 will be oscillated and gear 8 will be advanced and retracted one or more times (according with the contour of the cams) during each cycle of operation.

Motion of the driven member

The cams 17 are designed in such manner that as a resultant of the action of the elliptical gears and of the cams, driven pinion 12 will remain at rest during the first quarter movement of crank 1 in either direction. During the second quarter movement in either direction, driven pinion 12 will be rotated at a uniformly increasing speed, and during the third quarter will be rotated at a uniformly decreasing speed, remaining at rest during the fourth quarter of the crank movement.

Figure 4:
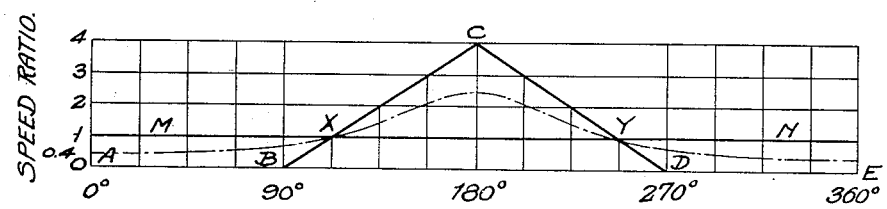
Fig. 4 is a graph representing the speed of the driven member of the gear train throughout the cycle of operation.

The speed of operation of driven pinion 12 is illustrated graphically in Figure 4. An operative cycle, comprising 360 degrees of movement, or one revolution of crank 1, is shown divided into four parts. The speed of the operating crank is considered as unity, and would be represented in Fig. 4 by the straight line M—N, which extends throughout the 360 degrees represented. If the gear 8 were held stationary throughout the cycle, the movement of the driven pinion 12 would correspond to the speed of elliptical gear 4; which is represented by the broken line. The contour of the cams 17 is such, however, that the speed transmitted from this elliptical gear 4 is modified so that during the first quarter of the cycle driven pinion 15 will stand still, and the speed value will be zero, as represented by the line A—B. During the second quarter of the cycle, driven pinion 12 will move at a uniformly increasing speed, so that at the end of the second quarter, a speed of four has been attained at the point C. During the third quarter, the speed decreases, reaching zero at point D and remaining at zero value during the fourth quarter.

Figure 5:
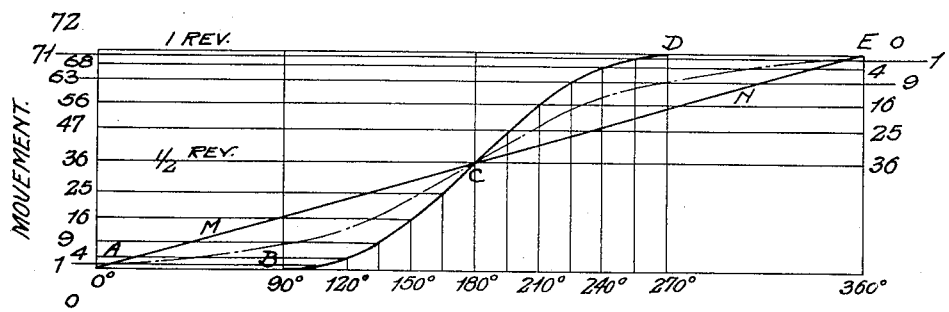
Fig. 5 is a graph representing the movement of the driven member throughout the cycle of operation.

Fig. 5 illustrates the movement of driving crank 1, the elliptical gear 4 and driven pinion 12 throughout the cycle of 360 degrees. The straight line M—N represents the movement of operating crank 1 during the 360 degrees of rotation, the broken line represents the corresponding movement of gear 4, and line A—B—C—D—E represents the movement of driven pinion 12 during the cycle. Curve B—C may be called a gravity curve, since the increments of movement represented by this curve are in exact proportion to the increments of movement of a falling body. The curve B—C is divided into six parts of fifteen degrees each, reading from ninety degrees upwardly, the increment in each part being in accordance with the mathematical series 1, 3, 5, 7, 9, 11. The total movement at any point is represented by the sum of the series to that point, so that at one hundred and twenty degrees the total movement equals 1 plus 3; at one hundred and thirty-five degrees it equals 1 plus 3 plus 5, etc. Therefore, the movement value of curve B—C is represented by the series 1, 4, 9, 16, 25, 36, which, it will be noted, are the squares of 1, 2, 3, 4, 5, and 6. Thus, at point C, driven pinion 12 has made a half rotation and crank 1 has made a half rotation, but pinion 15 is now travelling at a speed four times as great as that of the crank 1. During the third quarter turn of crank 1, driven pinion 12 will slow down with a uniformly retarded movement to zero speed, so that the curve C—D is exactly the reverse of the curve B—C. At the end of the third quarter, pinion 15 has completed one rotation and will remain at rest during the fourth quarter. The slope of the curve B—C—D at any given point is the measure of the speed of the driven pinion at that point, therefore a series of tangents drawn to line B—C at 90°, 105°, 120°, etc., would indicate the speeds at these points, and these tangents would form an arithmetical series of numbers indicating a uniform speed increment as illustrated by line B—C of Fig. 4.

These diagrams show clearly how the speed and movement of the driving element is modified first by the elliptical gears into an approximation of the driven speed and movement desired, so that the work thrown upon the cams is considerably less than it would be if uniform speed gears were employed. As a result, the cams will have a shorter and easier lift, and may be considerably reduced in size.

Contour of the cams

The contour of the cams 17, necessary to obtain the desired movement of the driven pinion 12, is considerably modified by the character of the gearing. Thus, while oscillation of lever 14 in one direction serves to counteract to a greater or less extent the movement imparted by elliptical gear 3 to driven pinion 12, and movement of said lever in the opposite direction will impart an augmented speed to the driven pinion 12, yet the moment of change of direction of lever 14 should not coincide with the moment of transition from idle to driven movement of pinion 12 or vice versa. This will be apparent from the fact that whenever lever 14 reverses its motion (at points x and y, Fig. 4), it has for an instant the speed of zero, at which time the speed transmission ratio corresponds to the gear ratio of the train, while on the other hand, when the driven member is idle and up to the instant at which movement is imparted thereto (at point B, Fig. 4), lever 14 must oscillate in a given direction at a speed which will counteract the speed of the elliptical gear 4. If the above-mentioned moments did coincide, the speed of the driven member would jump instantly from zero to a speed determined by the gear ratio and from the gear ratio speed to zero.

To accomplish the uniform acceleration and retardation above mentioned, cams 17 must move segmental gear 15 at a speed sufficient to counteract the action of the elliptical gears through the first ninety degrees of cycle and then must continue to move it in the same direction at the decreasing speed necessary to impart a uniform acceleration to the driven member, until such member has attained the speed of the elliptical gear 4 (at point X), whereupon the cams must cause segmental rack 15 to reverse its movement and continue in reverse at such speed as to impart a uniform increment of speed to the driven member throughout the rest of the second quarter of the cycle, at the end of which the driven member should have a speed of four. The cams must now cause segmental gear 15 to continue its movement in the same direction but at a decreasing speed until the driven member drops to the speed of the elliptical gear 4, (at point y), at which time the segmental rack must be caused to reverse its movement and start in the opposite direction at a speed suitable to uniformly decrease the speed of the driven member to zero at the end of the third quarter of the cycle. During the fourth quarter of the cycle, the segmental rack is caused to continue in the same direction at the speed necessary to impart zero speed to the driven member.

While with the construction shown, driven pinion 12 will always be at precisely the same point with relation to operating crank 1 when the parts are in full cycle position, it would obviously be possible to mount the cams 17 separately from the shaft 2 and to drive them from said shaft by gearing connections of any desired ratio. In this construction, although driven pinion 12 will not necessarily be in invariable position relative to crank 1 at the end of each revolution, a cyclic operation of pinion 12 will nevertheless occur.

The gears 3 and 4 are shown as elliptical in form, but obviously other forms of gears, having radii of varying length, may be employed, the contour best adapted to the purpose depending upon the nature of the movement to be imparted to the driven member.

I claim:
In a mechanical movement, a drive shaft, a variable radius gear mounted on said shaft, a cam mounted on said shaft, a driven member having gearing connection with said variable radius gear, and means including a rack interposed between said cam and said driven member and adapted to modify the variable movement imparted by said variable radius gear to said driven member.

Signed at Orange in the county of Essex and State of New Jersey this 8th day of August, A. D. 1930.

GEORGE C. CHASE.